(12) United States Patent
Richardson

(10) Patent No.: US 9,019,349 B2
(45) Date of Patent: Apr. 28, 2015

(54) AUTOMATED COLLECTIVE CAMERA CALIBRATION FOR MOTION CAPTURE

(75) Inventor: James D. Richardson, Corvallis, OR (US)

(73) Assignee: NaturalPoint, Inc., Corvallis, OR (US)

( * ) Notice: Subject to any disclaimer, the term of this patent is extended or adjusted under 35 U.S.C. 154(b) by 1046 days.

(21) Appl. No.: 12/847,996

(22) Filed: Jul. 30, 2010

(65) Prior Publication Data
US 2011/0025853 A1 Feb. 3, 2011

Related U.S. Application Data

(60) Provisional application No. 61/230,614, filed on Jul. 31, 2009.

(51) Int. Cl.
| | | |
|---|---|---|
| *H04N 15/00* | (2006.01) | |
| *H04N 5/232* | (2006.01) | |
| *G06T 7/20* | (2006.01) | |
| *H04N 5/225* | (2006.01) | |
| *H04N 5/247* | (2006.01) | |

(52) U.S. Cl.
CPC .......... *H04N 5/23203* (2013.01); *G06T 7/2033* (2013.01); *G06T 2207/10016* (2013.01); *G06T 2207/30204* (2013.01); *G06T 2207/30221* (2013.01); *H04N 5/2256* (2013.01); *H04N 5/247* (2013.01)

(58) Field of Classification Search
CPC ........................................................ H04N 7/18
USPC ........................................... 348/159, 47, 155
See application file for complete search history.

(56) References Cited

U.S. PATENT DOCUMENTS

| | | | | |
|---|---|---|---|---|
| 4,585,349 A | * | 4/1986 | Gross et al. | 356/624 |
| 7,978,224 B2 | * | 7/2011 | Dobrin | 348/211.11 |
| 8,107,682 B2 | * | 1/2012 | Gordon et al. | 382/103 |
| 8,203,628 B2 | * | 6/2012 | Honjo et al. | 348/240.99 |
| 2005/0052553 A1 | * | 3/2005 | Kido et al. | 348/296 |
| 2005/0062849 A1 | * | 3/2005 | Foth et al. | 348/159 |
| 2006/0008264 A1 | * | 1/2006 | Yamaguchi et al. | 396/121 |
| 2006/0055816 A1 | * | 3/2006 | Won et al. | 348/362 |
| 2008/0036863 A1 | * | 2/2008 | Esbensen | 348/159 |
| 2009/0103910 A1 | * | 4/2009 | Li et al. | 396/55 |

* cited by examiner

*Primary Examiner* — David Lazaro
*Assistant Examiner* — Marie Georges Henry
(74) *Attorney, Agent, or Firm* — Alleman Hall McCoy Russell & Tuttle LLP

(57) ABSTRACT

A motion-capture system is provided. The motion-capture system includes a host computing system and a plurality of motion-capture cameras that are operatively coupled with the host computing system. Each of the motion-capture cameras is disposed in a different location and orientation relative to a motion-capture space and includes a marker-tracking optical filter to provide a marker-tracking mode and thereby relatively enhance light from markers on a moving body in the motion-capture space. One or more of the motion-capture cameras is remotely controllable to selectively interchange the marker-tracking optical filter with a scene-view optical component, so as to selectively transition the motion-capture camera between the marker-tracking mode and a scene mode, in which light from the markers is less enhanced than in the marker-tracking mode.

31 Claims, 10 Drawing Sheets

AUTOMATED COLLECTIVE CAMERA CALIBRATION FOR MOTION CAPTURE

CROSS REFERENCE TO RELATED APPLICATION

This application claims priority to U.S. Provisional Application No. 61/230,614, filed Jul. 31, 2009, and titled AUTOMATED COLLECTIVE CAMERA CALIBRATION FOR MOTION CAPTURE. The entirety of the above listed application is incorporated herein by reference for all purposes.

BACKGROUND

Motion capture may be used to track movement of a real-world object to which a computer model may be mapped to produce animation that accurately imitates real-world movement. Further, motion capture may allow movement for animation to be produced in a quick manner relative to frame-by-frame animation. The quick production time may permit an animation director to experiment with different movements or perspectives before mapping the movement to computer models, which may result in more flexible animation production.

Typical motion-capture setups include multiple cameras that detect one or more objects (e.g., people that are fitted with markers) in a scene. In many cases, the motion-capture cameras are provided with filters to increase the signal-to-noise ratio of the image detected by the cameras in order to more easily identify markers. Further, a motion-capture setup may include one or more cameras that do not include a filter in order to provide a normal view of the scene. Throughout a motion-capture session, it may be beneficial to review the view with the markers as well as the normal view in order to verify that the tracked movement of the markers corresponds to actual movement of the objects in the scene.

However, the cameras that produce the different views may not be calibrated. In other words, the cameras may not be adjusted so that each of the cameras shares a collective mapping of camera parameters (e.g., a shared camera matrix). Operating the cameras that are not calibrated may result in playback and review that is labor intensive and inaccurate. This makes for inefficient use of time during a motion-capture session, which may result in increased production costs. On the other hand, individually calibrating the cameras may produce playback that may be reviewed more quickly, but the calibration process itself may be long and labor intensive. Further, in some cases, cameras may be in hard-to-access locations which may make camera calibration difficult to perform. Moreover, calibration may have to take place frequently because the cameras may become out of focus due to changes in temperature and vibrations produced over the course of a motion-capture session. As such, problems associated with long calibration times may be magnified by the fact that the cameras have to be repeatedly calibrated.

DETAILED DESCRIPTION

The present disclosure is related to calibration of cameras in a motion-capture system. More particularly, the present disclosure is related to collectively calibrating cameras in a motion-capture system via programmatic computer automation.

Furthermore, the present disclosure is related to a motion-capture camera that is switchable between different modes of operation that enables automatic collective camera calibration simultaneously. More particularly, the present disclosure is related to a motion-capture camera that is configured to switch between a marker-tracking mode and a scene mode. The motion-capture camera includes a marker-tracking optical filter that relatively enhances light from a scene and a scene-view optical component that relatively enhances light from the scene to a lesser degree than the marker-tracking optical filter. The motion-capture camera switches between the marker-tracking mode and the scene mode by positionally interchanging the marker-tracking optical filter and the scene-view optical component relative to an image sensor of the motion-capture camera. Moreover, the camera is remotely controllable by a host computing system to switch selected cameras between modes as desired.

Further still, the present disclosure is related to creating different views of a scene that correspond to the different operating modes or a combination thereof, and performing visual or other analysis based on information extracted from the different views in conjunction with marker tracking information collected from the calibrated motion-capture cameras. The disclosure also encompasses use of a composite/overlay view where a marker-tracking view is overlaid on a scene view to thereby align markers that are enhanced by light in the marker-tracking mode with a moving body in a scene that is captured in scene mode. Hybrid visual analysis is performed on the composite/overlay view to extract additional information about the scene including non-marker elements in the scene using marker-tracking data from the calibrated cameras. More particularly, hybrid visual is performed to track a position and/or movement of a non-marker object as a result of interaction with a moving body and associated markers in the scene.

Figure 1:
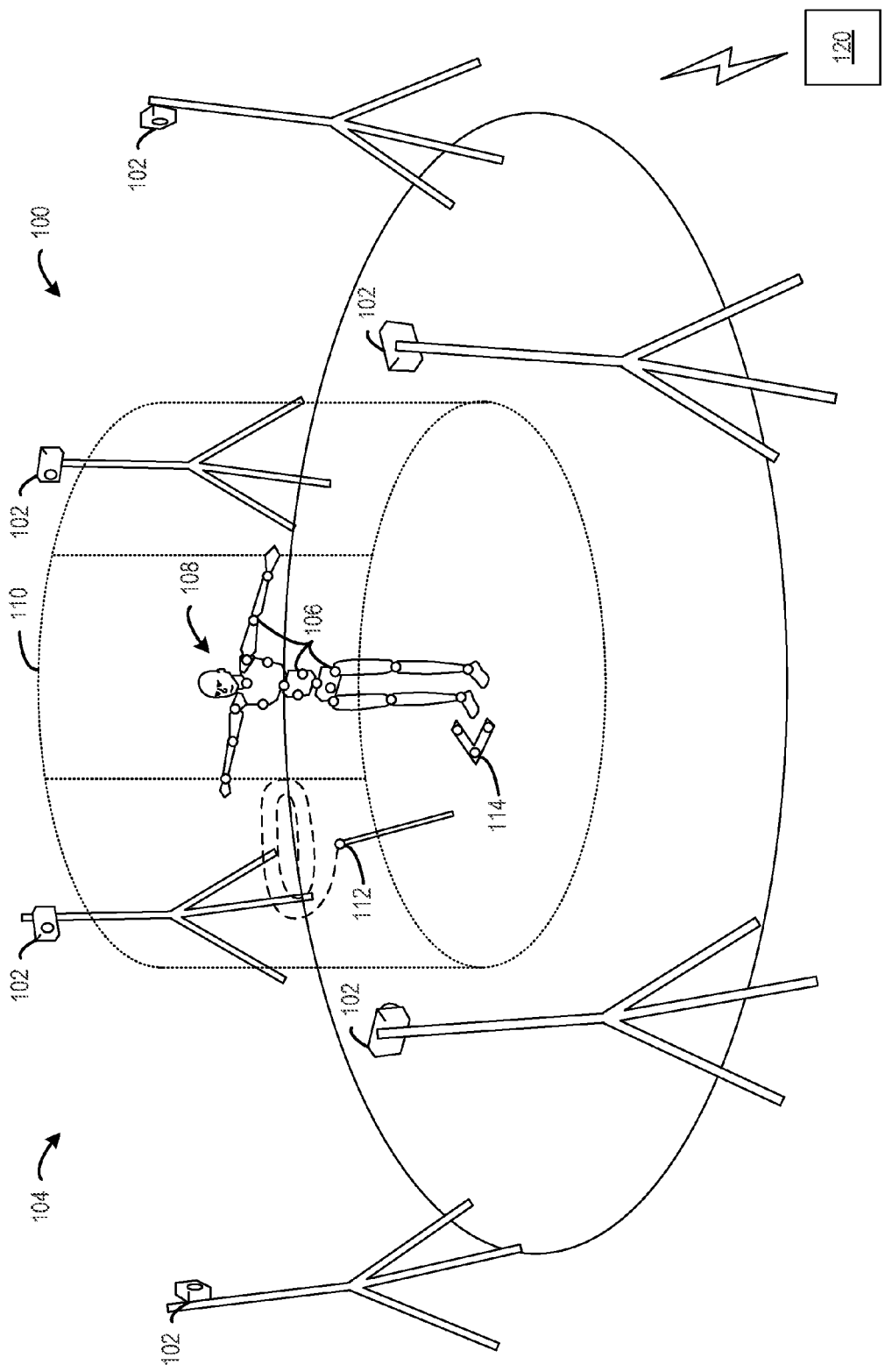
FIG. 1 is an embodiment of a motion-capture system according to the present disclosure.

FIG. 1 is an embodiment of a motion-capture system 100 according to the present disclosure. The motion-capture system 100 may comprise a plurality of motion-capture cameras 102 that are configured to receive light from a scene 104. Each of the plurality of motion-capture cameras 102 is remotely controllable by a host computing system 120. Each of the plurality of motion-capture cameras 102 is configured to relatively enhance light from the scene 104. In other words, each of the plurality of motion-capture cameras is configured to increase the signal-to-noise ratio of the scene 104 in order to make markers 106 appear brighter relative to other elements of the scene 104. As an example, the signal-to-noise ratio is increased by increasing the gain of the motion-capture camera. As another example, the signal-to-noise ratio is increased by filtering light received by an image sensor of the motion-capture camera. By detecting the scene where light from the markers is relatively enhanced, the markers 106 may be more easily identifiable by a motion-capture program executable by a host computing system 120.

In some embodiments, the markers 106 are passive markers that reflect incident light to enhance the brightness of markers 106 as detected by the plurality of cameras 102. Further, each of the plurality of cameras 102 may include a light source that is substantially coaxially aligned with an axis extending perpendicularly outward from each of the plurality of cameras to provide illumination to the passive markers. As an example, the passive markers include retro-reflective material that has a plurality of corner cube reflectors, or other structures/configurations to achieve corner-cube behavior. The light source of each camera provides infrared light that is reflected by the corner cube reflectors of the markers back toward the plurality of cameras to relatively enhance light from the markers relative to other elements of the scene.

In some embodiments, the markers 106 are active markers that emit their own light, as opposed to merely reflecting light. As an example, the active markers include powered light emitting diodes (LED) that provide illumination that is detected by the plurality of motion-capture cameras. The powered LEDs may provide light that is brighter than other elements of the scene so that the markers are easily detectably by the cameras. In some embodiments, the LEDs are infrared LEDs that provide infrared light that is not visible so as to not distract performers in the motion-capture space.

It will be appreciated that the plurality of motion-capture cameras 102 may relatively enhance light in any suitable manner. For example, a camera may include a light source to provide light for reflection by the markers that is substantially coaxially aligned with the camera, so that the markers appear brighter than other elements of the scene. As another example, a camera may include a filter that transmits or reflects a selected range of light wavelengths to increase the gain of the signal-to-noise ratio of the markers relative to other elements in the scene.

The markers 106 may be associated with a moving body 108 located in the scene 104. The markers 106 may be identified in order to track motion of the moving body 108. This type of camera operation is referred to herein as "marker-tracking mode" which may produce a marker-tracking view of the scene 104 by the host computing system 120. When operating in marker tracking mode, a combination of optical filters/components and/or firmware/software on-board a motion-capture camera and/or at the host computing system may be used to facilitate detection of markers as well as distinguish those markers from other elements in the scene.

In the illustrated embodiment, the moving body 108 may take the form of a person and the markers 106 may correspond to different joints or points of motion of the person. When the cameras operate in the maker-tracking mode, the position of the markers 106 may be detected by the plurality of cameras 102. The plurality of cameras 102 send marker position data to the host computing system 120. The position of the markers 106 correspond to movement of the person which may be mapped by the host computing system 120 to a 3D model for computer animation.

Note the moving body may include any suitable object or collection of objects whose position and/or movement is tracked using markers that are fixed relative to the moving body. For example, the moving body may include a face, a person, a group of people, etc. Moreover, any suitable number of markers may be employed on a moving body to suitably track movement of the moving body. In some cases, the moving body may include an object that does not move, but which is still tracked as a point of reference in the scene.

Furthermore, one or more cameras of the plurality of cameras 102 that are configured to operate in the marker-tracking mode additionally may be configured to enhance light from the scene to a lesser extent than in the marker-tracking mode. That is, one or more of the cameras may be configured to detect the scene 104 at a signal-to-noise ratio that is different than the signal-to-noise ratio used during the marker-tracking mode. For example, the signal-to-noise ratio may be lowered such that the scene is detected at a signal-to-noise ratio that approximates normal video recording where elements of the scene are substantially not skewed through light enhancement or other methods. In other words, the brightness of markers 106 may be enhanced to a lesser extent or not at all relative to other elements of the scene. This more balanced type of camera operation is referred to herein as "scene mode" operation, which may produce a scene view of the scene 104 by the host computing system 120. Cameras that are operable in the scene mode may be remotely controlled by the host computing system 120 to selectively transition between the marker-tracking mode and the scene mode. In some cases, all of the motion-capture cameras in the motion-capture system may be capable of operating in the marker-tracking mode as well as in the scene mode. In some cases, some motion-capture cameras may be capable of operating in the marker-tracking mode as well as the scene mode and some cameras may be capable of only operating in the marker-tracking mode. It should be appreciated that many different configurations and combinations are possible.

Continuing with FIG. 1, the motion-capture system 100 may be setup so that each of the plurality of cameras 102 has a different location and orientation in a motion-capture space to capture a different vantage point of the scene 104. More particularly, the plurality of cameras 102 may be configured to collectively detect a capture volume 110 of the scene 104. The capture volume 110 is defined as a three dimensional (3D) area collectively viewed by the plurality of cameras 102 in which the scene 104 and/or markers 106 are detectable.

The capture volume 110 may be defined based on or as a result of a camera calibration procedure in which each of the plurality of cameras 102 perform a given calibration step substantially simultaneously or substantially at the same time. During calibration, the motion-capture cameras are simultaneously set to operate in marker-tracking mode so that all of the cameras detect the position and/or movement of markers for calibration. For example, during the calibration procedure, a capture volume reference object 112 may be moved about an area so that it may be detected by each of the plurality of cameras 102 in order to create data points organized into a calibration data set from which the capture volume 110 may be defined. The reference object 112 may include any suitable marker that is detectable by the plurality of cameras 102. For example, the reference object may include one or more retro-reflective dots that are fixed relative to each other (e.g., a single dot wand, a three-dot array, etc.).

Further, a marker-defined reference plane 114 may be placed on the ground within the capture volume 110 and may be detected to create data points that are interpolated to define the plane at which the ground resides in the capture volume 110. The plane defined by the marker-defined reference plane 114 ties the position data captured by the plurality of cameras 102 to world coordinates that are local to the capture volume 110. As another example, various different patterns may be used to create data points, such as a grid or checkerboard pattern. It will be appreciated that the capture volume and camera calibration may be achieved in virtually any suitable manner utilizing any suitable reference object and/or marker-defined reference plane.

Furthermore, as part of the calibration procedure a calibration data set of data points created as a result of detecting movement of the reference object 112 and detecting the position of the marker-defined reference plane 114 may be used to determine intrinsic and extrinsic properties of each of the plurality of cameras 102 using minimization techniques. The intrinsic and extrinsic properties define parameters of each of the plurality of cameras 102 that produce a given photograph image or video (i.e., a sequence of image frames). The intrinsic properties may include parameters that define lens properties, focal length, distortion, pixels, pixels-per-degree, image format, and a principal point relative to the camera itself. The extrinsic properties may include parameters that define a position of a camera center and the camera's heading in world coordinates and may be defined relative to the other cameras. The solution to the calibration data set resulting from application of the minimization techniques that includes optimization of the intrinsic and extrinsic parameters of each camera may be represented, for example, by a series of transformations (e.g., a matrix of camera intrinsic parameters, a 3×3 rotation matrix, and a translation vector) that may be referred to as a camera projection matrix. The camera projection matrix can be used to associate points in a camera's image space with locations in 3D world space.

The camera calibration procedure may provide a solution to the calibration data set of position data received from each of the plurality of cameras 102. The solution to the calibration data set defines the intrinsic and extrinsic properties of each of the plurality of cameras 102. Since the same solution is used for calibration of all of the cameras, the intrinsic and extrinsic properties may be interpolated more quickly and easily by applying minimization techniques than by calibrating each camera individually. Moreover, each of the plurality of cameras 102 may be calibrated substantially simultaneously to reduce calibration time. Although it will be appreciated that each of the plurality of cameras 102 may be calibrated using the solution to the calibration data set without simultaneous calibration. Regardless of the particular timing of calibration or a given calibration step, it may be a substantial benefit to avoid having to use an entirely separate procedure to calibrate scene mode cameras.

It will be appreciated that the capture volume and camera calibration may be achieved in virtually any suitable manner.

For example, various different types of reference markers may be used to create data points for interpolation of the intrinsic and extrinsic properties of each camera. As another example, various different patterns may be used to create data points, such as a grid or checkerboard pattern.

Since the plurality of cameras 102 is collectively calibrated using the same solution to the calibration data set, the marker-tracking view produced by cameras operating in the marker-tracking mode and the scene view produced by cameras operating in the scene mode may be automatically calibrated. In other words, when the marker-tracking view is overlaid with the scene view, the markers 106 align with corresponding points on the moving body 108 (e.g., a person's joints and/or point of motion). The proper alignment of the markers 106 with the moving body 108 can be achieved because of the camera calibration procedure during which the properties of the camera are learned.

Subsequent to camera calibration, the host computing system can create a composite/overlay view where at least a portion of the marker-tracking view is overlaid on at least a portion of the scene view. Creation of the composite/overlay may be enabled based on calibration of the motion-capture cameras and the resulting solution to the calibration data set. Since the motion-capture cameras are calibrated, the plurality of markers that are relatively enhanced can be overlaid with the moving body in the scene so that the markers are suitably aligned with points of movement (e.g., joints, etc.) on the moving body. The composite/overlay view may have many useful applications that can be leveraged to improve accuracy and efficiency during a motion-capture session. For example, the composite view may be used to verify that the positions of the markers 106 correspond to the actual movement of the moving body. Moreover, the composite view may be used to reconstruct situations when the markers 106 do not correctly represent movement and/or position of the moving body in order to diagnose and solve the problem.

Moreover, the composite view may be enhanced by importing virtual objects such as animations or models that are aligned with the markers 106. For example, in a motion-capture session for a movie, a director may view a composite view of an actor and a model of a costume may be imported into the composite view and fit to the markers. Since the markers are aligned with the points of movement of the person, the costume may accurately move as the person moves in the scene view. The composite view may be used to by the director to quickly try different sets, costumes, camera angles, etc. that may facilitate more efficient use of a motion-capture session, which may result in shorter capture sessions and reduced production costs.

In some embodiments, during a motion-capture session some cameras may operate in the marker-tracking mode and some cameras may operate in the scene mode. For example, for every six cameras that operate in the marker-tracking mode, one camera may operate in the scene mode. This configuration may facilitate accurate marker tracking while still being able to produce a composite view that includes at least some of the marker-tracking view overlaid on at least some of the scene view.

Figure 2:
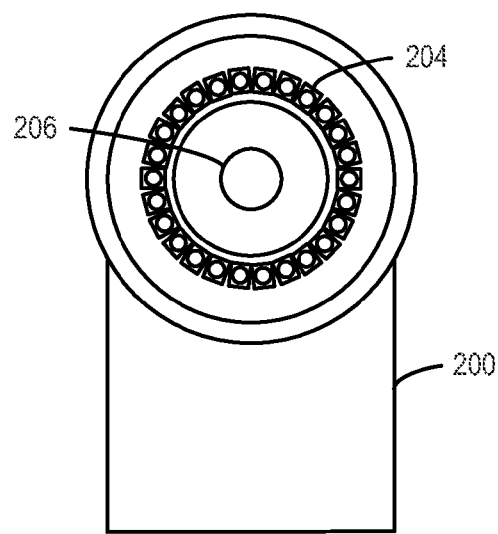
FIG. 2 is a front view of an embodiment of a motion-capture camera used in the motion-capture system of FIG. 1.
Figure 3:
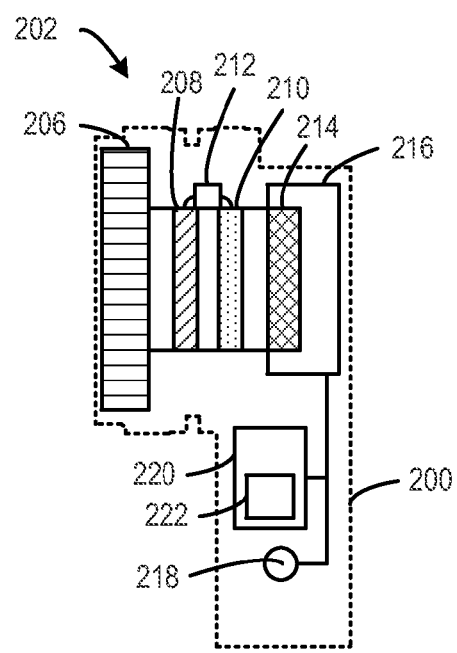
FIG. 3 is a right side cross section view of the motion-capture camera of FIG. 2.

FIGS. 2 and 3 show an example embodiment of a motion-capture camera 200 that may be used in a motion-capture system such as the motion-capture system 100 of FIG. 1. The motion-capture camera 200 may be configured to switch between operation in the marker-tracking mode and operation in the scene mode via a filter switcher assembly 202 shown in FIG. 3. The motion-capture camera 200 may include a light source 204 that is configured to outwardly direct light in a direction that is substantially coaxially aligned with an axis extending perpendicularly outward from an image sensor 216 (shown in FIG. 3) of the motion-capture camera. Since the light source is substantially coaxially aligned with the motion-capture camera, Incident light from the light source 204 is reflected by passive markers back to the image sensor so that light received at the image sensor from the passive markers appears enhanced relative to light received from other positions/directions.

In the illustrated embodiment, the light source 204 takes the form of a light emitting diode (LED) ring that surrounds a lens 206 of the motion-capture camera 200. The LED ring 204 may be selectively illuminated to adjust a signal-to-noise ratio of an image detected by the camera 200. Specifically, when the camera 200 operates in the marker-tracking mode, the LED ring 204 may be illuminated to increase the noise floor of the signal-to-noise ratio to increase the brightness of passive markers relative to other objects in the scene in order to more easily identify the markers. Correspondingly, when the camera operates in scene mode, the LED ring may not be illuminated so that light is enhanced to a lesser extent than in the marker-tracking mode and all objects in the scene may be observed without skewing.

In some embodiments, the light source 204 may provide infrared (IR) light that is not visible so as not to distract performers in the capture volume. However, it will be appreciated that any suitable wavelength of light may be used to illuminate a motion-capture space. In embodiments where active markers are employed, the light source 204 may be omitted from the motion-capture camera 200 or may remain turned off so as not to interfere with capture of the active markers.

The motion-capture camera 200 includes a filter switcher assembly 202 that is operable to switch the motion-capture camera between the marker-tracking mode and the scene mode. The filter switcher assembly includes the lens 206, a marker-tracking optical filter 208, a scene-view optical component 210, a switching mechanism 212, an imager 214, and an image sensor 216.

The lens 206 may be configured to modify light entering the motion-capture camera 200. For example, the lens 206 may focus light towards the imager 214 and/or image sensor 216. Depending on the mode of operation of the motion-capture camera 200, light modified by lens 206 may pass through the marker-tracking optical filter 208 or the scene-view optical component 210.

As discussed above, in some embodiments an IR-light source may be employed to illuminate the motion-capture space so as not to distract performers. In such embodiments, an image sensor that detects light in a range of visible light to IR light may be employed, so that the image sensor can detect light enhanced markers during the marker-tracking mode as well as objects in the scene during scene mode. Correspondingly, the lens 206 may be a polychromatic lens that is configured to focus light received at the image sensor from the motion-capture space that is substantially anywhere in the range from visible light to IR light. Accordingly, any light within the detectable range of the image sensor may remain in focus. Such a configuration may produce a more accurate image of the motion-capture space throughout various modes of operation relative to other configuration that include image sensors that are configured to detect a smaller range of light wavelengths and/or includes a lens that is not polychromatic.

The marker-tracking optical filter 208 may be positioned between the lens 206 and the image sensor 216 during the marker-tracking mode to enhance light from markers on a moving body in the motion-capture space. In the illustrated embodiment, the marker-tracking optical filter 208 is an IR-pass filter configured to pass IR light to the imager 214 and block visible and ultraviolet light. The IR-pass filter may be used in conjunction with the IR-LED ring to enhance passive IR markers during the marker-tracking mode. The marker-tracking optical filter 208 may include any suitable filter that selectively enhances light at a selected wavelength and/or range of wavelengths. Example marker-tracking optical filters may include high-pass, low-pass, and band-pass filters that are configured to transmit (or omit) selected wavelengths of light.

The scene-view optical component 210 may be positioned between the lens 206 and the image sensor 216 during the scene mode to enhance light from the markers on the moving body in the motion-capture space to a lesser extent than in the marker-tracking mode. In other words, the scene view optical component may be configured to pass light from markers, the moving body, and non-marker objects in the scene to the image sensor so that substantially everything in the motion-capture space may be captured in the scene view. In some embodiments, the scene view optical component may enhance light (e.g., pass/omit) at a different wavelength or range of wavelengths than the marker-tracking optical component. In some embodiments, the scene-view optical component may inversely correspond with the marker-tracking optical filter. For example, if the marker-tracking optical filter is an IR-pass filter then the scene-view optical component may be an IR-cut filter. In some embodiments, the scene-view optical component may be clear (e.g., glass) so as not to filter or substantially enhance light received from the lens.

The switching mechanism 212 is actuatable to positionally interchange the marker-tracking optical filter 208 and the scene-view optical component 210 relative to the image sensor 216. As such, the marker-tracking optical filter 208 and the scene-view optical component 210 may be alternately switched to a position in which light modified by lens 206 passes through the filter or the component to the image sensor 216 based on the mode of operation of the motion-capture camera. Specifically, during the marker-tracking mode, the marker-tracking optical filter 208 is positioned between the lens 206 and the image sensor 216 and the scene-view optical component 210 is positioned so as not to modify light received at the image sensor. Likewise, during the scene mode, the scene-view optical component 210 is positioned between the lens 206 and the image sensor 216 and the marker-tracking optical filter 208 is positioned so as not to modify light received at the image sensor. The switching mechanism 212 may include any suitable actuating mechanism. For example, the switching mechanism may include a solenoid that is actuated to positionally interchange the marker-tracking optical filter and the scene-view optical component by a controller 220 of the motion-capture camera 200.

In some embodiments, the marker-tracking optical filter and the scene-view optical component are configured so that focus in the motion-capture camera is substantially unchanged as a result of transitions between the marker-tracking mode and the scene mode. For example, the marker-tracking optical filter and the scene-view optical component may be the same thickness so as not to change the focal point of the light when the filter and component are interchanged and so as not to distort an image detected by the image sensor when the motion-capture camera switches operation between different modes. As another example, the marker-tracking optical filter and the scene-view optical component may have the same optical prescription. By placing the marker-tracking optical filter and the scene-view optical component between the lens and the image sensor, the size of the filter and the component may be reduced which may reduce the cost of the motion-capture camera.

The imager 214 may be configured to detect light intensity in the form of electromagnetic radiation that may be spatially resolved in an array of pixels of the imager 214. The image sensor 216 may be configured to create image data indicative of an image detected by the imager 214 by converting the electrical charge of each pixel of the imager 214 to a voltage as each pixel is read from the image sensor 216. In some embodiments, the imager may be included in the image sensor.

The motion-capture camera 200 may include a controller 220 that is configured to operate the motion-capture camera in the marker-tracking mode or the scene mode. The controller 220 includes a processor, memory/data storage that holds executable instructions for controlling the motion-capture camera 200. The controller 220 may include any suitable micro-processor or the like.

During the marker-tracking mode, the controller 220 controls the switching mechanism 212 to position the marker-tracking optical filter 208 to relatively enhance light from the markers received at the image sensor 216. Correspondingly, during the marker tracking-mode, the controller 220 may adjust various operating parameters of the motion-capture camera to enhance light received from the markers. For example, the controller may reduce the exposure time and/or increase the frame rate to enhance the brightness of markers relative to other objects in the scene. Furthermore, the controller 220 may perform marker-tracking analysis operations, such as brightness thresholding or marker interpolation to identify a position of the markers in the scene.

During the scene mode, the controller 220 controls the switching mechanism 212 to position the scene-view optical component to enhance light from the markers received at the image sensor 216 to a lesser extent than in the marker-tracking mode. Correspondingly, during the scene mode, the controller 220 may adjust various operating parameters of the motion-capture camera to enhance light from the markers to a lesser extend than in the marker-tracking mode. For example, the controller may increase the exposure time and/or decrease the frame rate to allow more light to reach the imager in order to form an image where the markers as well as other objects in the scene are visible and substantially not skewed. Note any suitable motion-capture camera operating parameter may be adjusted when switching between marker-tracking mode and scene mode.

In some embodiments, the controller 220 may execute preprogrammed macro functions when switching between operating modes that automatically adjust hardware and software functionality of the motion-capture camera. For example, executing a marker-tracking mode macro function may command actuation of the switching mechanism as well as adjustment of the exposure time and frame rate. Accordingly, switching between modes can be performed quickly without numerous individual adjustments that would consume time during a motion-capture session.

The controller 220 includes a video compression engine 222 that is configured to compress video frames of images generated by the image sensor 216 when operating in the scene mode. The compression engine 222 reduces a data rate of image data that is transmitted from the motion-capture camera to a host computing system via a communication link 218. For example, the video compression engine 222 may employ a motion joint photographic experts group (M-JPEG) codec to compress video frames of images by a 10:1 compression ratio. The compression operation can reduce the transmission data rate of the video data stream, for example from 36 megabytes per second to 3.6 megabytes per second. Such compression on-board the motion-capture camera prior to transmission to the host computing system enables for scalability of cameras that is beneficial in motion-capture applications. In other words, since the video data stream is compressed prior to transmission a plurality of motion-capture cameras can transmit video data streams simultaneously without creating bandwidth related transmission delays. Accordingly, analysis and processing by the host computing system can be performed in substantially real-time.

Note video frames of images generated by the image sensor when operating in the marker-tracking mode are not compressed by the video compression engine since the marker-tracking analysis operations may reduce the data rate of a video data stream generated during the marker-tracking mode. Moreover, further compression of the video data stream generated in the marker tracking mode may cause unwanted artifacts or image skewing.

The communication link 218 may enable the motion-capture camera 200 to be operatively coupled with a host computing system. The communication link 218 may be a wired or wireless link In some embodiments, the communication link may include a communication port that accepts a transmission wire. In some embodiments, the communication link may include a transceiver. The controller 220 may send image data to the computing device for image analysis and/or storage via the communication link 218.

In some embodiments, the motion-capture camera 200 may be controlled remotely from a host computing system. For example, the host computing system may send control signals to switch between operating modes. More particularly, to initiate marker-tracking mode, the host computing system may send control signals that command illumination of the IR-LED ring, position the IR-pass filter to filter light passing through the lens to the image sensor, and adjust operating parameters to relatively enhance light from markers received at the image sensor. As another example, the host computing system may send control signals to adjust camera settings based on collective camera calibration.

It will be appreciated that the above described motion-capture camera configuration is an exemplary embodiment and other embodiments of cameras, filters, and/or optical components may be implemented in the motion-capture system without departing from the scope of the present disclosure. For example, a filter, optical component, and/or filter switcher assembly may be attached externally to a camera instead of being integrated into the camera. This filter switcher configuration may include larger filters relative to a filter switcher integrated into a camera. Furthermore, filter types other than an IR-pass filter may be implemented. For example, a color filter may be implemented, such a red filter or a hue filter. In some embodiments, at least some filtering may be performed via image processing software executable by the controller or the host computing system in addition to or instead of mechanical filters and other software on-board the motion-capture camera.

Furthermore, while the illustrated embodiment of the motion-capture camera is employed in a passive marker setting, it will be appreciated that the motion-capture camera and related methods and applications may be employed in an active marker setting. Thus, in some embodiments, the light source may be omitted from the motion-capture camera, and light may instead be produced by the active markers. In some cases, the light source of the motion-capture camera may remain turned off during motion-capture in an active marker setting to not interfere with light produced by the active markers.

Figure 4:
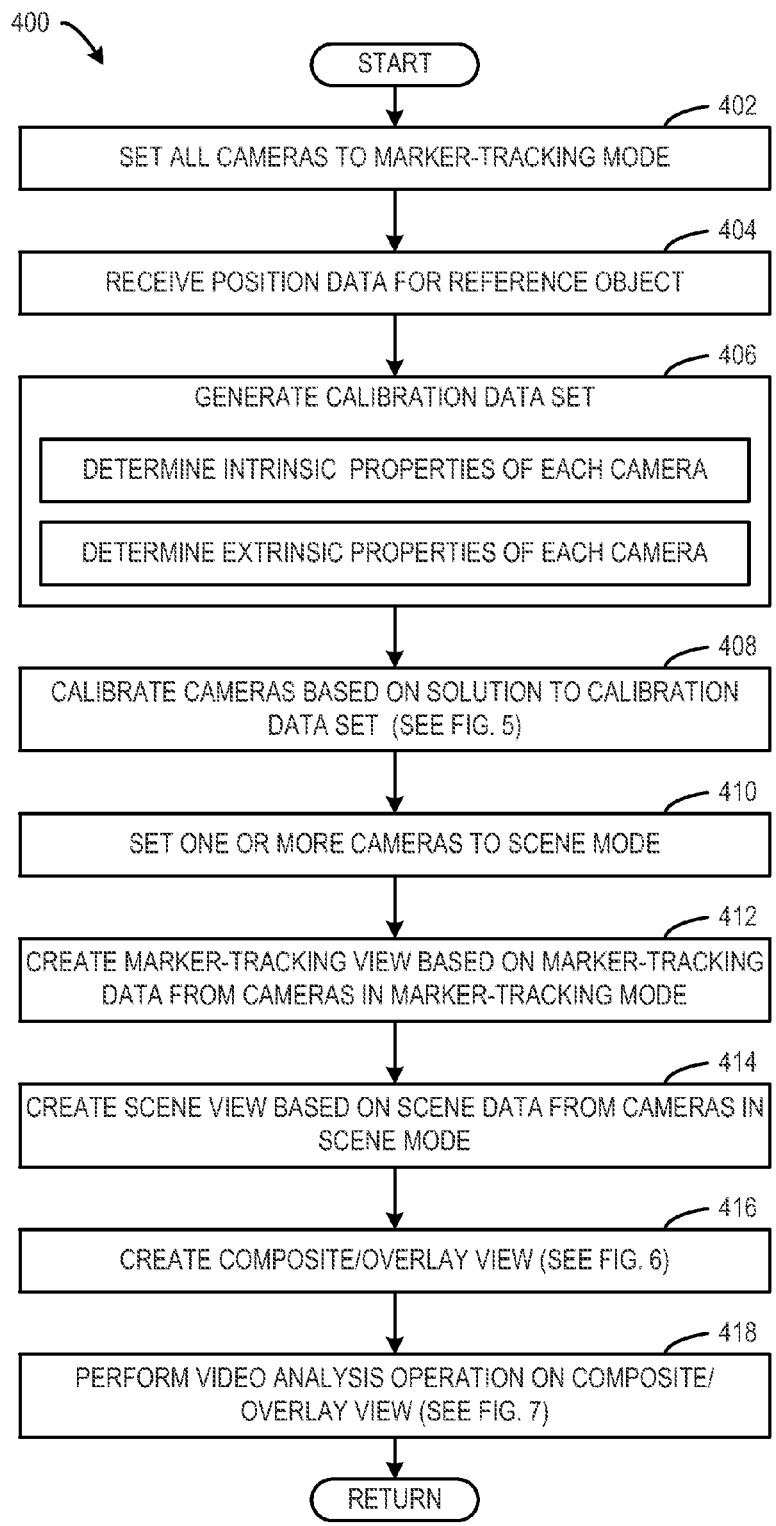
FIG. 4 is a flow diagram of an exemplary method for controlling motion-capture cameras of a motion-capture system.

FIG. 4 is a flow diagram of an embodiment of a method 400 for controlling motion-capture cameras of a motion-capture system. The method 400 may be performed in a motion-capture system where all cameras are configured to operate in the marker-tracking mode and one or more cameras are additionally configured to selectively transition between the marker-tracking mode and the scene mode. The method 400 is executable, for example, by the host computing system 120 shown in FIG. 1. At 402, the method may include setting all cameras of the motion-capture system to the marker-tracking mode. As an example, control signals are sent to each camera to illuminate the IR-LED ring, actuate the switching mechanism (where applicable), position the IR-pass filter to filter light that passes through a lens of the camera and is received at an image sensor, and adjust operating parameters to enhance light received from markers at the image sensor. The IR-LED ring, the IR-pass filter, and the operating parameters may cooperatively enhance IR-reflective markers relative to other objects in a scene captured by the motion-capture cameras so that the markers are easily identifiable.

At 404, the method may include receiving position data associated with a position of a reference object in the scene. The position data may be received substantially simultaneously from each of the motion-capture cameras. The position data may include data points associated with the position of the reference object as it moves around the scene in the motion-capture space. Different data points may be received from each camera, and may differ according to the location and orientation of each camera in the world (i.e., world coordinate system) as well as relative to every other camera in the motion-capture system. As an example, the reference marker used to generate position data is a wand including a three-dot fixed array that is moved around within the scene such that it is detected simultaneously by each of the cameras to produce the data points that form a calibration data set.

Furthermore, the reference object may include a marker-defined reference plane that is presented to the motion-capture cameras. For example, the marker-defined reference plane may include three markers that are fixed relative to one another in a plane. The markers may provide position data that may determine information regarding the direction of the X, Y, and Z axes in the scene as well as an origin. The data points may be used to set a frame of reference in a world coordinate system to local position data produced by each camera.

At 406, the method may include generating a calibration data set from the position data collectively received from each of the motion-capture cameras. The calibration data set may include parameters for intrinsic and extrinsic properties of the motion-capture cameras that are to be optimized for the plurality of motion-capture cameras through calibration. The intrinsic properties may include parameters that define lens properties, focal length, distortion, pixels, pixels per degree, image format, and principal point relative to the camera itself. The intrinsic properties may be determined via interpolation of data points associated with the reference object from different cameras. In other words, the intrinsic properties of each camera may be determined based on the position data collectively produced by the cameras of the motion-capture system.

Furthermore, generating the calibration data set may include determining parameter values for the extrinsic properties of each camera based on the position data associated with the marker-defined reference plane. The parameters of the extrinsic properties may also be determined, at least in part, via interpolation of data points associated with the reference object (e.g., the wand). The extrinsic properties may include parameters that define the position of a camera's center and the camera's heading in world coordinates and may be defined relative to the other cameras. The extrinsic properties of each camera may be determined based on the position data collectively produced by the cameras of the motion-capture system. Note parameters for the intrinsic and extrinsic properties may be calculated simultaneously for each of the cameras as part of the calibration process.

At 408, the method may include calibrating the cameras of the motion-capture system based on a solution to the calibration data set calculated according to a minimization technique. The solution set provides a frame of reference to a world coordinate system defined by the extrinsic properties that are shared by all of the calibrated cameras. The calibration step may be performed substantially simultaneously at each of the cameras in the motion-capture system. Calibrating the cameras may include adjusting settings of the cameras to be synchronized with the other cameras of the motion-capture system. Calibrating the cameras may include providing a capture volume of the scene in which all cameras may detect a marker/record an object. The calibration of the cameras may be performed collectively since each camera produces data points associated with the position of the same reference marker that are used to find a solution that optimized the intrinsic and extrinsic properties of each camera. This may allow the position of each camera to be learned relative to each other camera as well as within the world. Calibration of the motion-capture cameras will be discussed in further detail below with reference to FIG. 5.

At 410, the method may include setting one or more, but less than all, of the cameras of the motion camera system to operate in scene mode. As an example, control signals are sent to the camera to turn-off the IR-LED ring, actuate the switching mechanism to position the scene-view optical component between the lens and the image sensor, and adjust operating parameters to relatively enhance light from markers to a lesser extent than in the marker-tracking mode. By setting one or more, but less than all of the cameras to operate in scene mode, the scene may be captured by cameras operating in the marker-tracking mode to provide marker-tracking data to create the marker-tracking view and by cameras operating in the scene mode to provide scene data to create the scene view. The cameras may be set to scene mode subsequent to calibration, so as to align the marker-tracking view the scene view.

At 412, the method may include creating a marker-tracking view based on marker-tracking data received from the motion-capture cameras that are set to the marker-tracking mode. The marker-tracking view includes a visual representation of the markers that is relatively enhanced by the marker-tracking optical filter of the motion-capture cameras operating in the marker-tracking mode so as to appear brighter than other objects in the scene. As an example, the marker-tracking view appears substantially black and white. More particularly, markers detected by the camera are represented as white or lighter colored and the background as black or darker colored.

At 414, the method may include creating a scene view based on scene view data received from the motion-capture cameras that are set to the scene mode. The scene view provides a clear depiction of the moving body in the scene. The markers may also be visible on the moving body, but since the light from the markers is enhanced to a lesser extent in the scene mode relative to the marker-tracking mode, the moving body and other objects in the scene are just as visible as the markers. As an example, the scene view appears monochrome or gray scale and includes all objects in the capture volume.

At 416, the method may include creating a composite/overlay view where at least a portion of the marker-tracking view is overlaid on at least a portion of the scene view based on the solution to the calibration data set to thereby align the visual representation of the markers with the moving body. For example, the scene view may include a person moving in the capture volume and the marker-tracking view may include highlighted markers associated with the person's joints. Accordingly, the composite view may include a gray scale image (still or video) of the person with the highlighted markers aligned with the person's joints. The composite view may be created because all of the cameras of the motion-capture system are calibrated based on shared or collective solution to the calibration data set. In some embodiments, the composite view may be created in real-time during the motion-capture session. Creation of the composite/overlay view will be discussed in further detail below with reference to FIG. 6.

At 418, the method may include performing a hybrid video analysis operation on the composite/overlay view. The hybrid video analysis operation may include any suitable operation to extract information about objects with markers or non-marker objects in the composite/overlay view based on marker-tracking data. For example, performing the hybrid video analysis operation may include tracking a position of a non-marker object in the composite view based on marker-tracking data. Furthermore, the movement of a non-marker object may be tracked using image analysis in combination with the marker-tracking data. More particularly, a movement path of a non-marker object subsequent to interaction with a moving body may be calculated based on marker-tracking data that indicates movement of the moving body relative to the non-marker object. Performing hybrid video analysis operations will be discussed in further detail below with reference to FIG. 7

The above method may be performed to calibrate motion-capture cameras of a motion-capture system in quick and automated manner such that a marker-tracking view and a scene view produced during a capture session may be accurately aligned to create a composite/overlay view. Note any given calibration step of the above control method may be performed substantially at the same time for all of the motion-capture cameras. Thus, by collectively calibrating the cameras all in the same process at substantially the same time, time for calibration of the motion-capture system may be substantially reduced relative to motion-capture systems in which cameras are individually calibrated. Moreover, the benefits of reduced time for camera calibration may be appreciated over a period of several capture sessions since camera calibration may be performed numerous times (e.g., once per capture session) due to changes in temperature and vibration that may cause a camera to become out of focus. In general, it will often be a significant benefit to avoid having to use a separate calibration operation for one or more of the cameras involved in the motion-capture system.

Furthermore, the automated nature of the method for camera calibration may allow for quicker calibration and more flexible motion-capture system setups. In particular, each camera may be programmatically calibrated without having to physically adjust the cameras. This is also applies to the filter switcher assembly in each camera. In other words, since the filter switcher is embedded in the camera and may be automatically actuated from a remote host computing system, a filter does not have to be physically attached or removed from a camera, which may further facilitate calibration accuracy. Further, since the camera calibration is automated, cameras may be placed in positions that may not be easily accessible, but may be good for capture or for perspective of a scene.

Figure 5:
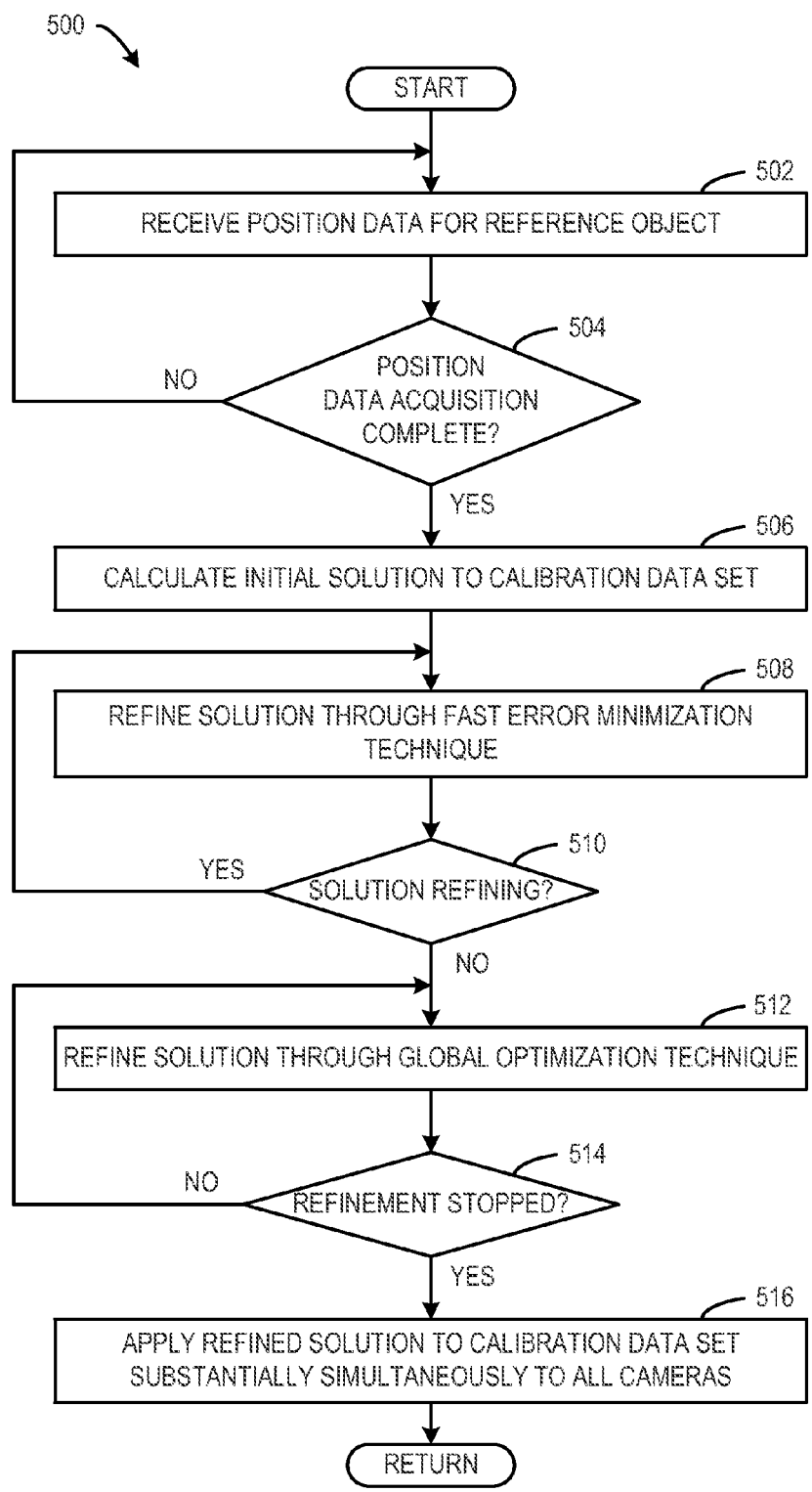
FIG. 5 is a flow diagram of an exemplary method for collectively calibrating motion-capture cameras of a motion-capture system.

FIG. 5 is a flow diagram of an embodiment of a method 500 for collectively calibrating motion-capture cameras of a motion-capture system. The method 500 is executable, for example, by the host computing system 120 shown in FIG. 1. At 502, the method may include receiving position data for a reference object. The position data may be sent from a plurality of motion-capture cameras operating in the marker-tracking mode. The position data may include marker-tracking data that has been processed on-board the cameras to indicate the position of the markers in the motion-capture space.

At 504, the method may include determining if position data acquisition is complete. The determination may be made in any suitable manner. For example, data acquisition may be completed in response to user input. As another example, data acquisition may be completed after a predetermined duration. If it is determined that data acquisition is complete the method moves to 506. Otherwise, the method returns to 502.

At 506, the method may include calculating an initial solution to a calibration data set. The calibration data set may include the intrinsic and extrinsic parameters of the plurality of motion-capture cameras. The solution attempts to fit intrinsic and extrinsic parameter values to the position data points of the calibration data set.

At 508, the method may include refining the solution through a fast error minimization technique. The fast error minimization technique may try to solve for variables of the calibration data set to increase the accuracy of the calibration data set or the number of known parameters in the calibration data set. The rapid solution refinement may continue until the solution fails to become more accurate with each iteration.

At 510, the method may include determining if the solution to the calibration data set is being refined. If the solution is being refined the method returns to 508. Otherwise, the method moves to 512.

At 512, the method may include refining the solution to the calibration data set through a global optimization technique. The global optimization technique may be a slower error minimization technique that continually iterates to refine the solution until the process is terminated.

At 514, the method may include determining if refinement of the solution is stopped. For example, the solution refinement may be stopped in response to user input. As another example, the solution refinement may be stopped after a predetermined duration. As yet another example, the solution refinement may be stopped in response to passing a refinement threshold. If the solution refinement is stopped the method moves to 516. Otherwise, the method returns to 512.

At 516, the method may include applying the refined solution to the calibration data set substantially simultaneously to all camera of the motion-capture system. The applied solution may define the intrinsic and extrinsic parameters of each camera in the motion-capture system to fit to the calibration data set of data points collected from capture of the reference objet.

The above method may be performed to provide the plurality of motion-capture cameras with a shared set of parameters in order to increase the accuracy of position tracking in the scene as well as alignment between the marker-tracking view and the scene view.

Figure 6:
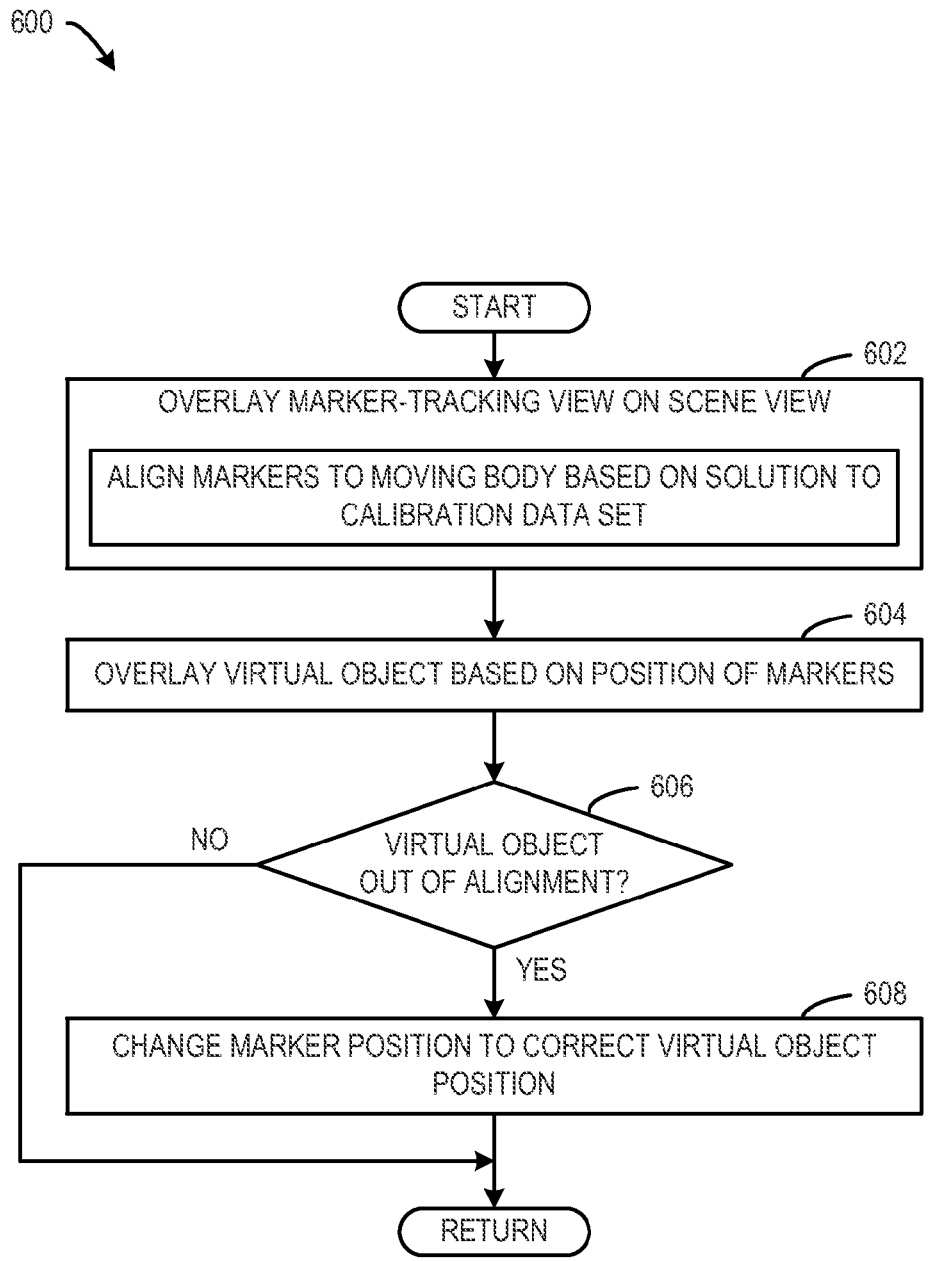
FIG. 6 is a flow diagram of an exemplary method for creating a composite/overlay view of a scene captured by calibrated motion-capture cameras of a motion-capture system.

FIG. 6 is a flow diagram of a method 600 for creating a composite/overlay view of a scene captured by calibrated motion-capture cameras of a motion-capture system. The method 600 is executable, for example, by the host computing system 120 shown in FIG. 1. At 602, the method may include overlaying at least portion of the marker-tracking view on at least a portion of the scene view. The marker-tracking view may be overlaid on the scene view based on the solution to the calibration data set to thereby align a visual representation of the markers with the moving body.

At 604, the method may include overlaying a virtual object on the moving body based on the position of the markers. Any suitable virtual object may be overlaid on the moving body. For example, an animated skeleton that moves according to movements of the markers can be overlaid on a person to track accuracy of movement between the markers and the person as viewed in the composite/overlay view. As another example, a virtual object may include a tag that identifies a selected feature of the moving body so that movement of the selected feature can be tracked separate from movement of the entire moving body.

At 606, the method may include determining if the virtual object is out of alignment with the actual movement of the moving body. The determination may be made, for example, based on user input. As another example, image analysis or computer vision techniques may be employed to make the determination. If it is determined that the virtual object is out of alignment with the moving body the method moves to 608. Otherwise, the method returns to other operations.

At 608, the method may include changing a marker position of the visual representation of the markers in the composite view to correct the alignment of the virtual object with the moving body. Due to the collective camera calibration, the composite view may be suitably accurate to correct tracked movement that does not match actual movement of an object during a capture session as observed from movement of the moving body relative to the markers.

The above method enables a user to review and correct captured movement quickly (e.g., close to or substantially real-time) to provide accurate motion-capture video imagery. Moreover, by overlaying virtual objects on the composite view, users may highlight selected captured movements of a moving body. Further still, a user may experiment with different looks (e.g., virtual costumes) as a moving body moves throughout a scene. In this way, motion-capture sessions may be made more efficient and production costs may be reduced.

Figure 7:
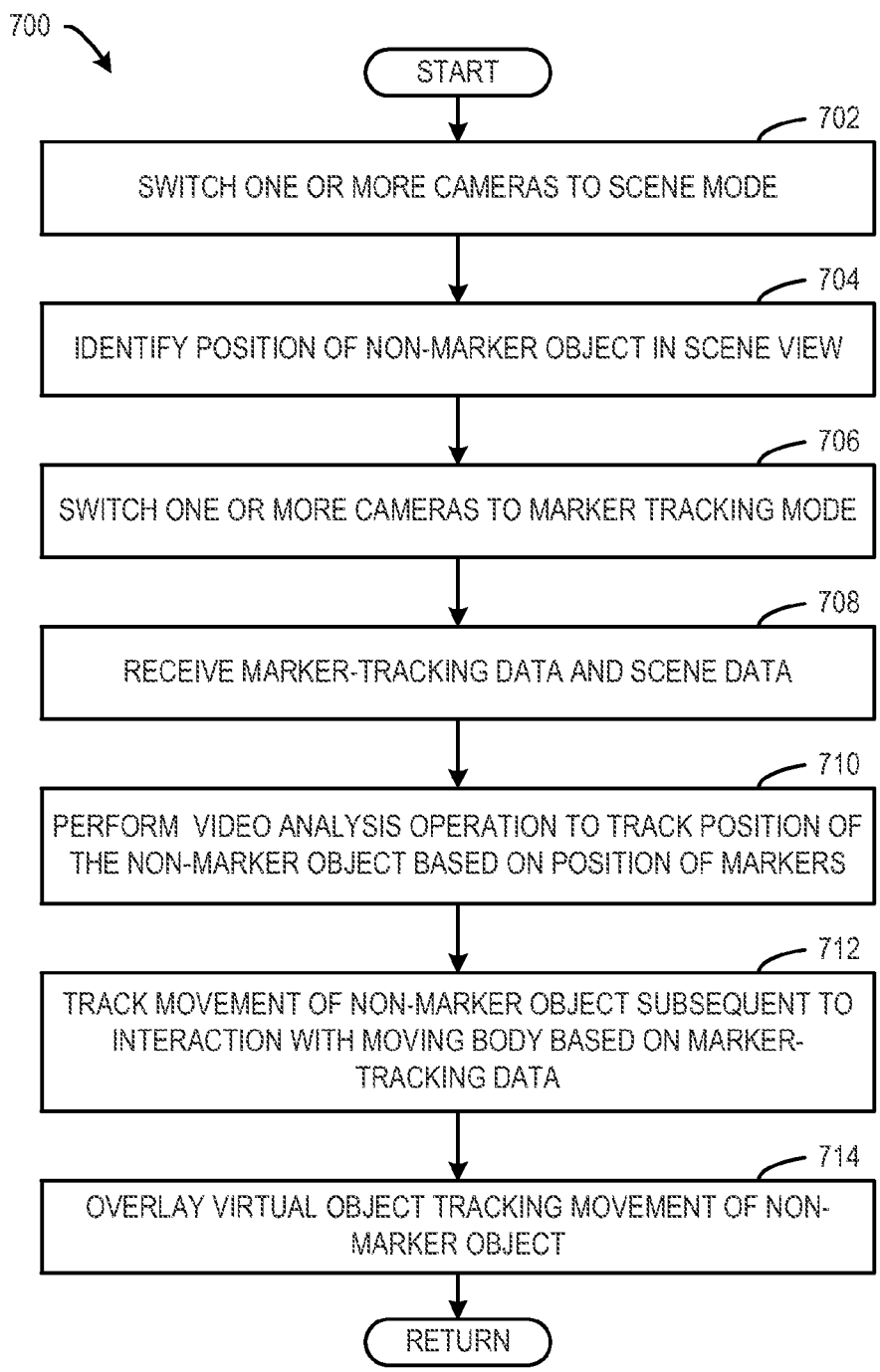
FIG. 7 is a flow diagram of an exemplary method for performing hybrid video analysis on a composite/overlay view.

FIG. 7 is a flow diagram of a method 700 for performing hybrid video analysis on a composite/overlay view. The method 700 is executable, for example, by the host computing system 120 shown in FIG. 1. At 702, the method may include switching one or more calibrated motion-capture cameras to the scene mode.

At 704, the method may include identifying a non-marker object in the scene view. For example, the position of the non-marker object may be identified based on user input. More particularly, user input may include selection of a region in the scene view. As another example, image analysis techniques may be employed on the gray scale image of the scene view to identify the non-marker object in the scene view.

At 706, the method may include switching one or more, but not all, of the cameras to marker-tracking mode.

At 708, the method may include receiving marker-tracking data and scene data. The marker-tracking data may be received from cameras operating in the marker-tracking mode. The marker-tracking data may indicate the position of markers in the scene. The scene data may be received from cameras operation in the scene mode. The scene data may include gray scale image data of the scene. The marker-tracking data and the scene data may be received substantially simultaneously.

At 710, the method may include performing a video analysis operation on the composite view to track a position of the non-marker object relative to a position of the markers. Performing the video analysis operation may include classifying parameters of the non-marker object, such as shape, color, brightness, etc. to identify where the non-marker object is positioned in the scene.

At 712, the method may include tracking movement of the non-marker object subsequent to interaction with the moving body based on the marker-tracking data. Video analysis operations may be performed to determine various movement parameters of the moving body based on movement of the markers. For example, direction and speed of the moving body may be calculated from the marker-tracking data. If the moving body impacts the non-marker object a resulting force, impact position, and/or direction of travel can be determined from the marker-tracking data. Such data can be applied to the non-marker object to track the resulting movement of the non-marker object.

At 714, the method may include overlaying a virtual object on the composite view at a position that tracks the movement of the non-marker object. The virtual object highlights the movement path of the non-marker object. Overlaying the virtual object further may include overlaying a virtual object (e.g., boundary lines) that guides the movement path of the non-marker object or the moving body. For example, the virtual object may present a boundary marker at which the moving body may be captured by the motion-capture cameras. As another example, the boundary lines may define a virtual area where the non-marker object or the moving body would interfere with an imported virtual object (e.g., animated setting, character, etc.)

By performing hybrid video analysis on the composite/overlay view which takes into consideration marker-tracking data, meaningful positional and movement information can be highlighted or enhanced which would not occur otherwise in the gray scale image of the scene view. In this way, a user may easily identify and analyze captured movements and resulting interactions.

The above methods may be implemented for different types of motion capture including facial motion tracking, fully body motion tracking, and arena motion tracking. The above methods may be implemented in virtually any suitable application where markers are identified for position tracking.

Figure 8:
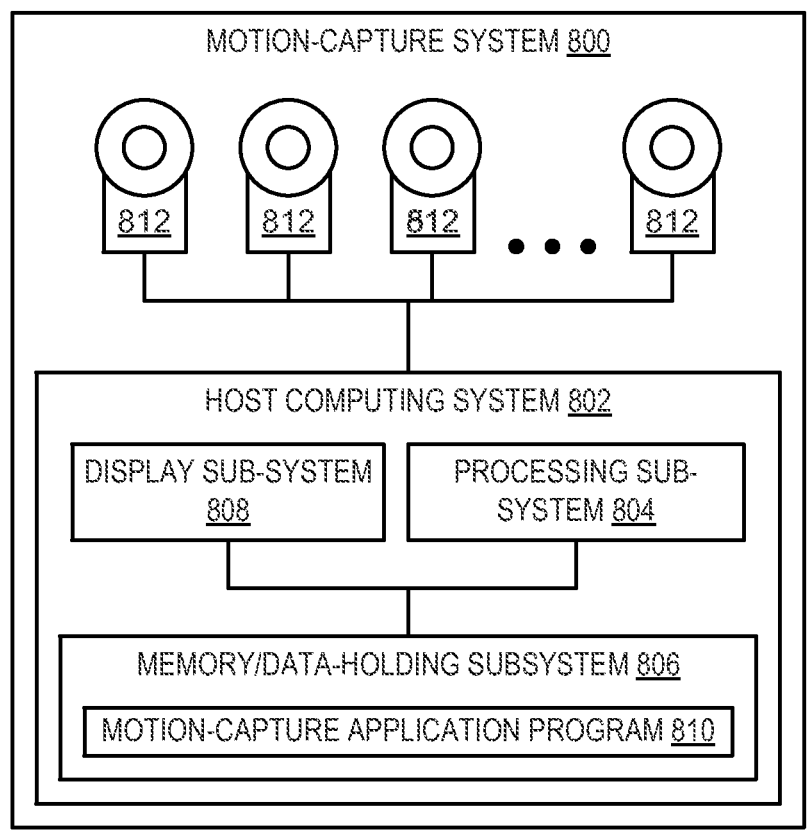
FIG. 8 is a schematic diagram of an embodiment of a motion-capture system according to the present disclosure.

In some embodiments, the above described methods and processes may be tied to a computing system of a motion-capture system. As an example, FIG. 8 schematically shows a motion-capture system 800 that includes a host computing system 802 that may perform one or more of the above described methods and processes. The host computing system 802 includes a processing sub-system 804 memory/data-holding sub-system 806, and a display sub-system 808. The host computing system 802 may be operatively coupled to motion-capture cameras 812.

The processing sub-system 804 may include one or more physical devices configured to execute one or more instructions. For example, the processing sub-system may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The processing sub-system may include one or more processors that are configured to execute software instructions. Additionally or alternatively, the processing sub-system may include one or more hardware or firmware logic machines configured to execute hardware or firmware instructions. The processing sub-system may optionally include individual components that are distributed throughout two or more devices, which may be remotely located in some embodiments.

Memory/data-holding sub-system 806 may include one or more physical devices configured to hold data and/or instructions in the form of motion-capture application program 810 executable by the processing sub-system to implement the herein described methods and processes. When such methods and processes are implemented, the state of memory/data-holding sub-system 806 may be transformed (e.g., to hold different data). Memory/data-holding sub-system 806 may include removable media and/or built-in devices. Memory/data-holding sub-system 806 may include optical memory devices, semiconductor memory devices, and/or magnetic memory devices, among others. Memory/data-holding sub-system 806 may include devices with one or more of the following characteristics: volatile, nonvolatile, dynamic, static, read/write, read-only, random access, sequential access, location addressable, file addressable, and content addressable. In some embodiments, processing sub-system 804 and memory/data-holding sub-system 806 may be integrated into one or more common devices, such as an application specific integrated circuit or a system on a chip.

Motion-capture application program 810 may be configured to receive image data from cameras 812. The motion-capture application program 810 may be configured to send control signals to collectively calibrate the cameras 812 based on the image data. The motion-capture application program may be configured to create a marker-tracking view, a scene view, and a composite/overlay view from the image data received from the calibrated cameras.

Display sub-system 808 may be used to present a visual representation of data held by memory/data-holding sub-system 806. As the herein described methods and processes change the data held by the memory/data-holding subsystem, and thus transform the state of the memory/data-holding sub-system, the state of display sub-system 808 may likewise be transformed to visually represent changes in the underlying data. Display sub-system 808 may include one or more display devices utilizing virtually any type of technology. Such display devices may be combined with processing sub-system 804 and/or memory/data-holding sub-system 806 in a shared enclosure, or such display devices may be peripheral display devices.

Figure 11:
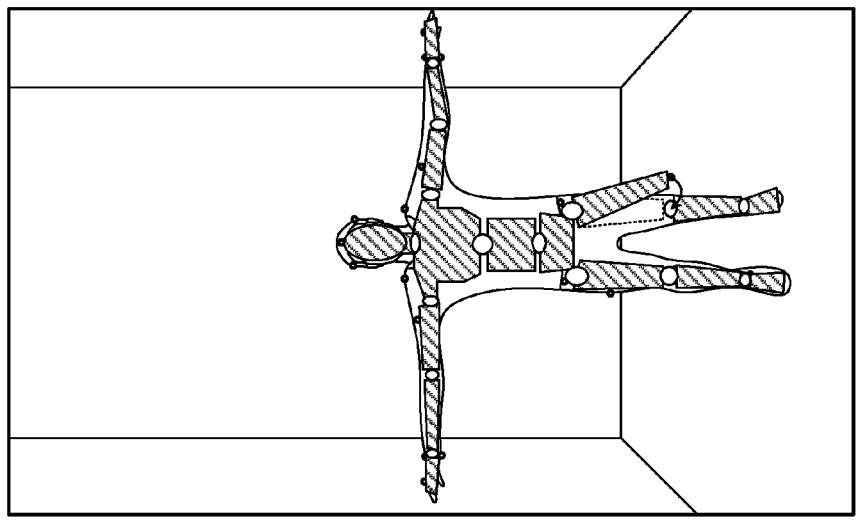
FIG. 11 shows an example composite/overlay view of the arena motion-capture setup of FIG. 9.
Figure 10:
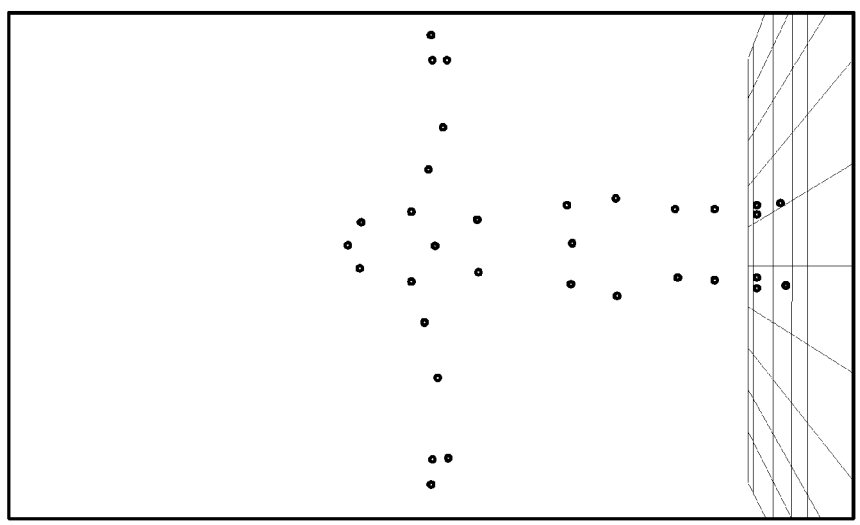
FIG. 10 shows an example marker-tracking view of the arena motion-capture setup of FIG. 9.
Figure 9:
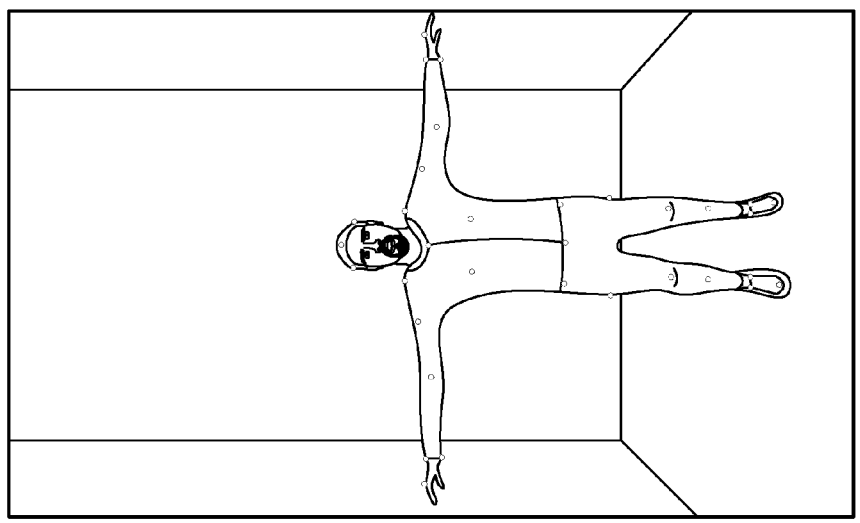
FIG. 9 shows an example scene view of an arena motion-capture setup.

The above methods may be implemented in various applications to compare movement of a real-world object to a tracked position. FIGS. 9-11 depict an example of a full body motion capture that is performed, for example, by the motion-capture system 100 of FIG. 1. FIG. 9 shows an example scene view of the arena motion-capture setup. The scene view provides a clear depiction of a person standing in the capture volume. The scene view provides a gray scale image of all of the objects in the scene. In some embodiments, the scene view may be a color image. Further, markers are visible on the person in the scene view. The markers are fixed relative to moving parts of the person. Since light from the markers is enhanced to a lesser extent in the scene mode relative to the marker-tracking mode the person and other objects in the scene are just as visible as the markers. In other words, in the scene mode the markers are not enhanced anymore than other objects in the scene including the person.

FIG. 10 shows an example marker-tracking view of the arena motion-capture setup. The marker-tracking view shows only the markers without the other objects in the scene including the person. In the illustrated embodiment, the marker-tracking view is substantially black and white. However, in some embodiments, the marker-tracking view may be in gray scale or color. Since light from the markers is enhanced during the marker-tracking mode, the markers appear more visible than the other objects in the scene. In some cases, operating parameters of the motion-capture camera may be adjusted so that non-marker objects in the scene may be visible, but may appear darker than the light enhanced markers. Furthermore, the marker-tracking view includes a virtual plane representative of the ground that is defined during the calibration process so that the markers can be shown in relation to a reference.

FIG. 11 shows an example composite/overlay view of the arena motion-capture setup. The composite view includes the light enhanced markers from the marker-tracking view aligned with the person in the scene view. The alignment of the markers with the person is based on the solution to the calibration data set as determined during the motion-capture camera calibration process. Furthermore, the composite view includes a virtual object, in this example a schematic skeleton, which is overlaid on the person based on the position of the markers. The skeleton enables a viewer of the composite view to quickly and easily analyze movement of the markers in comparison to the person to check for accuracy of the motion-capture. As shown, in the composite view, an upper portion of the skeleton's leg appears out of alignment with the upper portion of the person's leg. As such, the position of the marker that is out of alignment can be changed to align the upper portion of the skeleton's leg with the upper portion of the person's leg.

The composite view of the arena motion-capture setup can be used advantageously in a variety of applications. For example, the composite view can be used in movie applications. In particular, since the composite view may be produced in real-time, a movie director/actor may use the composite view for pre-visualization where models of costumes or a setting may be imported to the composite view and may be accurately overlaid on actors or sets within the capture volume, so that the director/actor may preview the scene. By changing the position of the markers in the composite view, the virtual models may be accurately aligned with the real-life performer throughout the motion-capture session.

Figure 12:
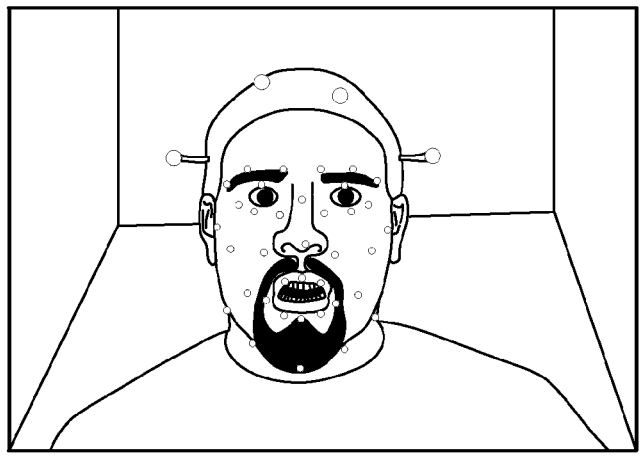
FIG. 12 shows an example scene view of a facial motion-capture setup.
Figure 13:
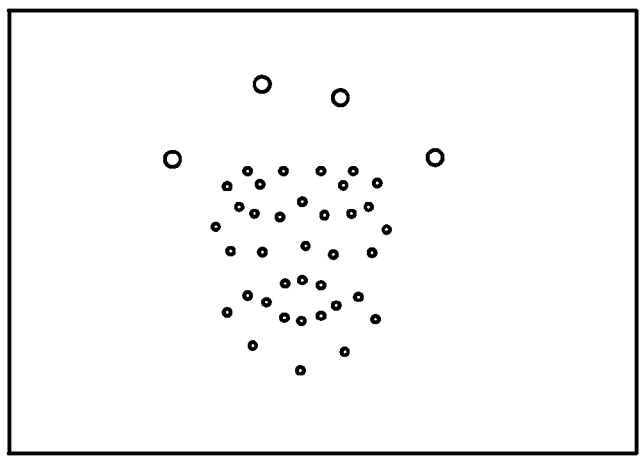
FIG. 13 shows an example marker-tracking view of the facial motion-capture setup of FIG. 12.
Figure 14:
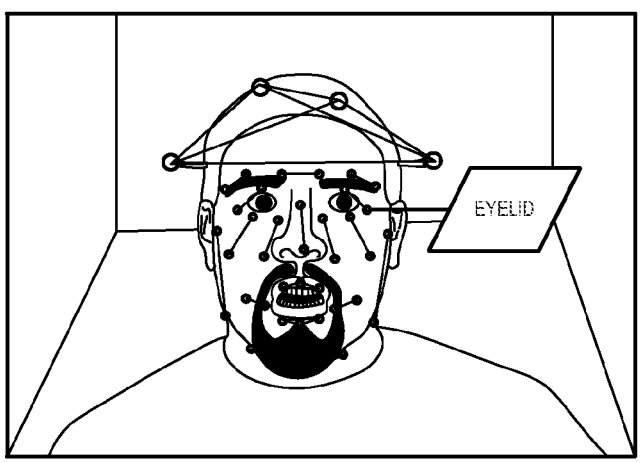
FIG. 14 shows an example composite/overlay view of the facial motion-capture setup of FIG. 12.

FIGS. 12-14 depict an example of a facial motion-capture that is performed, for example, by the motion-capture system 100 of FIG. 1. FIG. 12 shows an example scene view of the facial motion-capture setup. The scene view provides a clear depiction of a person's face. The scene view provides a gray scale image where all of the facial features are easily recognizable. Further, markers that are fixed relative to features of the person's face are visible. Since light from the markers is enhanced to a lesser extent in the scene mode relative to the marker-tracking mode the person's face is just as visible as the markers. In other words, in the scene mode the markers are not enhanced anymore than the person's face.

FIG. 13 shows an example marker-tracking view of the facial motion-capture setup. The marker-tracking view shows only the markers without the person's face being visible. The marker-tracking view is substantially black and white. Since light from the markers is enhanced during the marker-tracking mode, the markers appear more visible than the person's face. In some cases, operating parameters of the motion-capture camera may be adjusted so that non-marker objects, such as features of the person's face may be visible, but may appear darker than the light enhanced markers. Furthermore, a virtual ground plane is omitted from the marker-tracking view in this example due to the small size of the facial motion capture.

FIG. 14 shows an example composite/overlay view of the facial motion-capture setup. The composite view includes the light enhanced markers from the marker-tracking view aligned with the person's face in the scene view. The alignment of the markers with the person's face is based on the solution to the calibration data set as determined during camera calibration process. Furthermore, the composite view includes relational lines that are overlaid on the composite view based on the position of the markers. The relational lines delineate specific features of the person's face (e.g., eye, eyebrow, mouth, cheek, etc.). The relational lines enable a viewer of the composite view to quickly and easily identify specific movement of selected features (e.g., movement of specific face muscles). The specific facial features identified by the relational lines further include feature tags that are overlaid on the composite view to more easily identify a particular feature for analysis. By tagging specific features of the face, movement of the features can be tracked separate from movement of the entire face.

Furthermore, the composite view may be used for hybrid analysis. For example, in this facial expression motion-capture application, where markers are placed on bone/muscle structure of the person's face (e.g., cheeks, jaw, eyebrows, etc.). The markers can be used to track gross movements of the face and the grey-scale image may be used to track minute movements or movements that are not practical to be tracked by markers, such as a person's eye movement. By producing a composite view both the gross and minute movements may be tracked in the same view.

Figure 15:
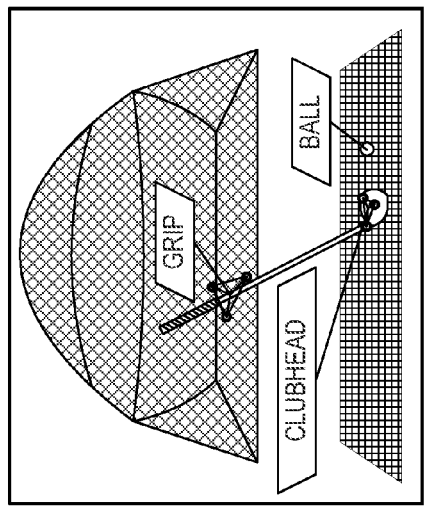
FIG. 15 shows an example scene view of a golf swing analysis motion-capture setup.

FIGS. 15-20 depict an example of motion capture for golf swing analysis that involves hybrid video analysis of the composite view. FIG. 15 shows an example scene view of a golf swing analysis motion-capture setup. The scene view is a gray scale image showing a golf club and golf ball resting on a practice mat and a ball-shagging net in the background of the scene. Further, markers that are fixed relative to the golf club are visible. Since light from the markers is enhanced to a lesser extent in the scene mode relative to the marker-tracking mode the golf club and other objects in the scene are just as visible as the markers. In other words, in the scene mode the markers are not enhanced anymore than the other objects in the scene.

Figure 16:
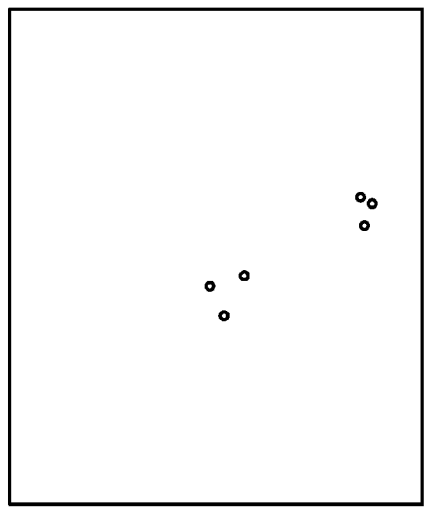
FIG. 16 shows an example marker-tracking view of the golf swing analysis motion-capture setup of FIG. 15.

FIG. 16 shows an example marker-tracking view of the golf swing analysis motion-capture setup. The marker-tracking view shows only the markers without the golf club and other objects in the scene being visible. The marker-tracking view is substantially black and white. Since light from the markers is enhanced during the marker-tracking mode, the markers appear more visible than the other objects.

Figure 17:
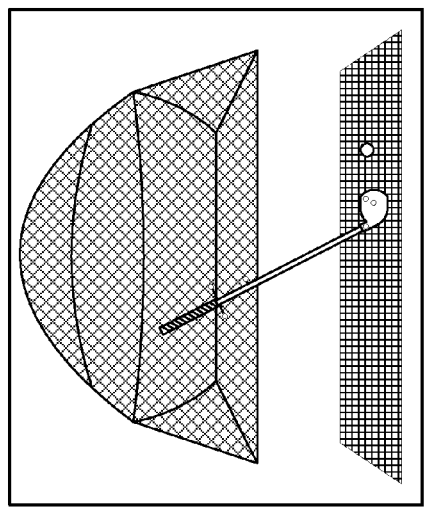
FIG. 17 shows an example composite/overlay view of the golf swing analysis motion-capture setup of FIG. 15.

FIG. 17 shows an example composite/overlay view of the golf swing analysis motion-capture setup. The composite view includes virtual tags that are overlaid on the composite view to identify selected parts of the golf club based on the position of the markers. In particular, the club head and the grip of the golf club are specifically identified and the movement of each of the selected parts can be tracked individually for specific club swing analysis.

The composite view may be advantageously used for golf swing analysis and club fitting. In addition to the golf club, markers may be placed at a person's joints (e.g., knee, hip, shoulder) and the composite view may show the person swinging a club with the markers or a skeletal model overlaid on the person. This composite view may allow the golfer to accurately identify movements of their body as well as the position of the golf club relative to their body so as to correct their swing. As another example, a composite view may be used in bicycle application in order to identify hip and knee movement for bike fitting purposes.

Figure 18:
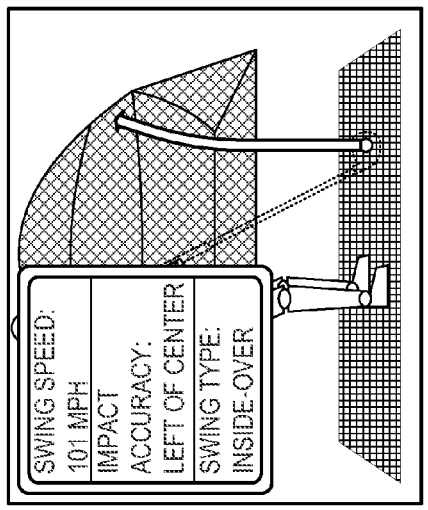
FIGS. 18-20 show an example of hybrid visual analysis performed using the composite/overlay view of FIG. 17
Figure 19:
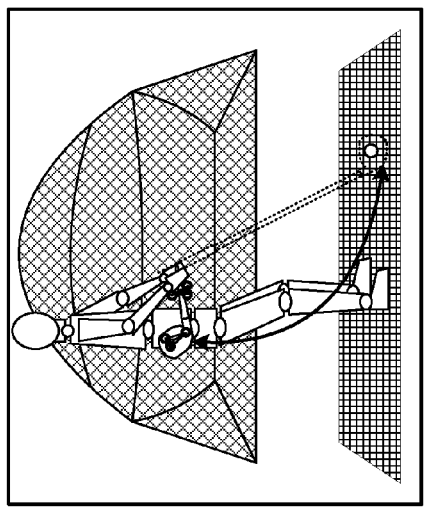
Figure 20:
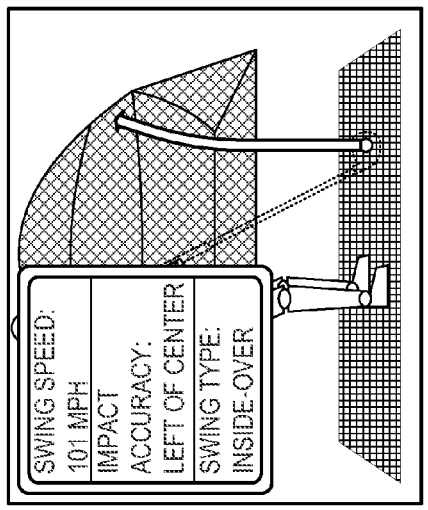

FIGS. 18-20 show an example of hybrid video analysis performed using the composite/overlay view for golf swing analysis. As part of hybrid video analysis, image analysis techniques can be performed on the gray scale image to identify the position of non-marker objects in the scene. As shown in FIG. 18, the position of the golf ball may be identified using such techniques and a virtual tag may be overlaid on the composite view to identify the position of the golf ball for tracking its position and/or movement. Identifying the ball in this manner may be advantageous since it may be impractical to place markers physically on the golf ball since it may impede proper contact with the golf club head during the swing. The position of the identified golf ball may be tracked relative to the markers affixed to the golf club.

FIG. 19 shows the swing path of the golf club. The markers affixed to the golf club track the position of the golf club relative to the person (represented by a schematic skeleton) and relative to the position of the golf ball. Hybrid video analysis may be performed using the marker-tracking data to determine various parameters of the golf swing. For example, the marker-tracking data may be used to determine a swing speed of the club, a swing direction, a swing type, a force vector of the club face, and the like based on the change in position of the club during the swing as tracked by the markers.

Furthermore, these parameters may be applied in further hybrid video analysis operations to determine movement of the golf ball subsequent to interaction with the golf club. For example, since the position of the golf ball is identified and the position of the club is tracked by the markers, an impact location of the golf ball on the golf club head can be determined. This information can be applied to the other determined parameters to determine a flight path of the golf ball subsequent to impact with the golf club.

FIG. 20 shows virtual objects overlaid on the composite view that present the determinations of the hybrid video analysis to the user. In particular, a virtual flight path is overlaid on the composite view at a position that tracks the movement of the golf ball. The virtual flight path provides a clear indicator of where the golf ball traveled as a result of the golf swing. Furthermore, the swing speed, impact accuracy, and swing type as determined from the hybrid video analysis are overlaid on the composite view for the user to view. It will be appreciated that hybrid video analysis which combines image analysis techniques with marker-tracking data can be used to determine virtually any suitable motion parameter. Moreover, the motion parameters can be used to interpolate position and/or movement of other non-marker objects in the scene. Such information may be beneficial for visual analysis in real-time to enable position and movement tracking and corrections.

It will be appreciated that the embodiments and method implementations disclosed herein are exemplary in nature, and that these specific examples are not to be considered in a limiting sense, because numerous variations are possible. The subject matter of the present disclosure includes all novel and nonobvious combinations and subcombinations of the various intake configurations and method implementations, and other features, functions, and/or properties disclosed herein.

The invention claimed is:

1. A motion-capture system, comprising:
 a host computing system; and a plurality of motion-capture cameras operatively coupled with the host computing system, where each of the motion-capture cameras is disposed in a different location and orientation relative to a motion-capture space and includes a marker-tracking optical filter that is wavelength selective to provide a marker-tracking mode and thereby relatively enhance light from markers on a moving body in the motion-capture space, where one or more of the motion-capture cameras is remotely controllable by the host computing system to actuate an automatic switching mechanism to selectively interchange the marker-tracking optical filter with a scene-view optical component, so as to selectively transition the motion-capture camera between the marker-tracking mode and a scene mode, in which light from the markers is less enhanced than in the marker-tracking mode, and where the host computing system is configured to calibrate the motion-capture cameras, where such calibration entails (i) using motion-capture cameras in the marker-tracking mode to detect markers within the motion-capture space; and (ii) processing, at the host computing system, information based on the detecting of the markers to determine the position of each of the motion-capture cameras relative to one another and relative to coordinates of the motion-capture space.

2. The system of claim 1, where each of the plurality of motion-capture cameras includes a light source to provide illumination to passive markers.

3. The system of claim 2, where the light source is infrared.

4. The system of claim 3, where for each of the plurality of motion-capture cameras, the marker-tracking optical filter relatively enhances transmission of infrared light, and where for the one or more of the motion-capture cameras that are selectively transitionable between the marker-tracking mode and the scene mode, the scene-view optical component is an infrared-cut filter.

5. The system of claim 1, where the marker-tracking mode for each of the plurality of motion-capture cameras is operable to track the markers via infrared light, and where a polychromatic lens is provided on the one or more of the motion-capture cameras that are selectively transitionable between the marker-tracking mode and the scene mode.

6. The system of claim 1, where for each of the plurality of motion-capture cameras, the marker-tracking optical filter and marker-tracking mode are configured to provide tracking of active markers.

7. The system of claim 1, where the one or more of the motion-capture cameras that are selectively transitionable between the marker-tracking mode and the scene mode are configured to, when in the scene mode, compress image data prior to transmitting such image data to the host computing system.

8. The system of claim 1, where for the one or more of the motion-capture cameras that are selectively transitionable between the marker-tracking mode and the scene mode, the marker-tracking optical filter and the scene view optical component are configured so that focus in the motion-capture camera is unchanged as a result of transitions between the marker-tracking mode and the scene mode.

9. The system of claim 1, where the host computing system is configured to simultaneously calibrate the plurality of motion-capture cameras in response to the detecting of the markers within the motion-capture space.

10. The system of claim 1, where the calibration further entails processing, at the host computing system, information based on the detecting of the markers to determine properties of lenses of the one or more of the motion-capture cameras.

11. The system of claim 1, where the detecting of the markers within the motion-capture space includes tracking movement of markers on a reference object moved within the motion-capture space.

12. The system of claim 1, where the detecting of the markers within the motion-capture space includes detecting markers on a marker-defined reference plane positioned within the motion-capture space.

13. The system of claim 1, where subsequent to said calibration, the host computing system is configured to create a composite view including a visual representation of the markers that are relatively enhanced by light from the marker-tracking optical filter that is overlaid on at least a portion of a scene view that includes the moving body to thereby align the visual representation of the markers that are relatively enhanced by the marker-tracking optical filter with the moving body in the composite view.

14. The system of claim 13, where the host computing system is configured to perform a video analysis operation on the composite view to track a position of a non-marker object in the composite view relative to a position of the visual representation of the markers.

15. The system of claim 13, where tracking the position of the non-marker object includes tracking a movement of the non-marker object subsequent to interaction with the moving body based on a movement of the visual representation of the markers.

16. The system of claim 15, where the composite view includes a virtual object overlaid at a position that tracks the movement of the non-marker object.

17. A motion-capture camera apparatus comprising:

an image sensor configured to receive incident light from a motion-capture space and thereby generate an image of the motion-capture space, where the image of the motion-capture space provides information regarding a reference object in the motion-capture space to a host computing system in order to determine the position of the motion-capture camera apparatus relative to each of a plurality of motion-capture cameras and relative to the motion-capture space;

a wavelength-selective marker-tracking optical filter;

a scene-view optical component;

a switching mechanism actuatable, via remote control from the host computer, to automatically positionally interchange the marker-tracking optical filter and the scene-view optical component relative to the image sensor; and a controller, operable in a marker-tracking mode, to control the switching mechanism so that the marker-tracking optical filter is positioned relative to the image sensor to relatively enhance light received at the image sensor from a plurality of markers on a moving body in the motion-capture space, and operable in a scene mode, to control the switching mechanism to automatically positionally interchange the marker-tracking optical filter and the scene-view optical component so that the scene-view optical component is positioned relative to the image sensor to enhance light received at the image sensor from the plurality of markers to a lesser extent than in the marker-tracking mode.

18. The apparatus of claim 17, where the plurality of markers each include retro-reflective material, and the apparatus further comprises:

a light source configured to outwardly direct light in a direction that is coaxially aligned with an axis extending perpendicularly outward from the image sensor, to enhance light reflected by the retro-reflective material of each of the plurality of markers toward the image sensor.

19. The apparatus of claim 17, where the image sensor detects light in a range of visible light to infrared light, and the apparatus further comprises:
a polychromatic lens to focus light received from the motion-capture space that is anywhere in a range toward the image sensor.

20. The apparatus of claim 17, where the marker-tracking optical filter includes an infrared-pass filter and the scene-view optical component includes an infrared-cut filter.

21. The apparatus of claim 17, where the marker-tracking optical filter and the scene-view optical component are configured so that focus in the motion-capture camera is unchanged as a result of positional transitions between the marker-tracking mode and the scene mode.

22. The apparatus of claim 17, where the controller adjusts an operating parameter of the motion-capture camera apparatus in response to switching between the marker-tracking mode and the scene mode to thereby enhance light during the marker-tracking mode and enhance light to a lesser extent than in the marker-tracking mode during the scene mode.

23. The apparatus of claim 17, further comprising:
a communication link; and
the controller further includes a video compression engine to compress video frames of images generated by the image sensor when operating in the scene mode to thereby reduce a data rate for transmission via the communication link, and where video frames of images generated by the image sensor when operating in the marker-tracking mode are not compressed by the video compression engine.

24. A method for remotely controlling a plurality of motion-capture cameras each disposed in a different location and orientation in a motion-capture space, each of the plurality of motion-capture cameras being operable in a marker-tracking mode where each of the plurality of motion-capture cameras relatively enhances light from a plurality of markers on a moving body in the motion-capture space via use of a marker-tracking optical filter, and where one or more motion-capture cameras of the plurality of motion-capture cameras is remotely controllable to actuate an automatic switching mechanism to selectively positionally interchange the marker-tracking optical filter with a scene-view optical component, so as to selectively transition the motion-capture camera between the marker-tracking mode and a scene mode, where the one or more motion-capture cameras enhances light from the plurality of markers to a lesser extent than in the marker-tracking mode, the method comprising:
setting the plurality of motion-capture cameras to the marker-tracking mode;
receiving, from each of the plurality of motion-capture cameras, position data for a reference object as the reference object moves in the motion-capture space, the position data forming a calibration data set;
simultaneously calibrating the plurality of motion-capture cameras by processing the calibration data set to determine (i) the position of each motion-capture camera relative to one another and relative to coordinates of the motion-capture space, and (ii) properties of lenses of the one or more of the motion-capture cameras;
setting one or more, but less than all, of the motion-capture cameras to the scene mode;
creating a marker-tracking view based on marker-tracking data received from motion-capture cameras that are set to the marker-tracking mode, the marker-tracking view including a visual representation of the plurality of markers that are relatively enhanced by the marker-tracking optical filter;
creating a scene view based on scene data received from the one or more motion-capture cameras that are set to the scene mode, the scene view including the moving body; and
creating a composite view where at least a portion of the marker-tracking view is overlaid on at least a portion of the scene view based on a solution to the calibration data set to thereby align the visual representation of the plurality of markers with the moving body.

25. The method of claim 24, where the video data is compressed by a compression engine included in the one or more motion-capture cameras that are set to the scene mode.

26. The method of claim 24, where the position data further includes information for a marker-defined reference plane; and
simultaneously calibrating includes the plurality of motion-capture cameras sharing a frame of reference to a world coordinate system.

27. The method of claim 24, where the composite view includes a virtual object overlaid on the moving body based on a position of the visual representation of the plurality of markers.

28. The method of claim 27, further comprising:
changing, in the composite view, a position of one or more of the markers of the visual representation of the plurality of markers in response to the virtual object being out of alignment with the moving body to thereby align the virtual object with the moving body.

29. The method of claim 24, further comprising:
performing a video analysis operation on the composite view to track a position of a non-marker object in the composite view relative to a position of the plurality of markers as indicated by the marker-tracking data.

30. The method of claim 29, where tracking the position of the non-marker object includes determining a movement of the non-marker object subsequent to interaction with the moving body based on the marker-tracking data.

31. The method of claim 30, where the composite view includes a virtual object overlaid at a position that tracks the movement of the non-marker object.

* * * * *